(12) United States Patent
Yau et al.

(10) Patent No.: US 11,037,373 B2
(45) Date of Patent: Jun. 15, 2021

(54) METHOD AND SYSTEM FOR GENERATING A 3D DIGITAL MODEL USED FOR CREATING A HAIRPIECE

(71) Applicant: TRUE HAIR LLC, Somerville, MA (US)

(72) Inventors: Shing-Tung Yau, Somerville, MA (US); Eugene M. Yau, Somerville, MA (US); Dale Owen Royer, Somerville, MA (US)

(73) Assignee: TRUE HAIR LLC, Somerville, MA (US)

( * ) Notice: Subject to any disclaimer, the term of this patent is extended or adjusted under 35 U.S.C. 154(b) by 0 days.

(21) Appl. No.: 16/639,516

(22) PCT Filed: Aug. 13, 2018

(86) PCT No.: PCT/US2018/046439
§ 371 (c)(1),
(2) Date: Feb. 14, 2020

(87) PCT Pub. No.: WO2019/036333
PCT Pub. Date: Feb. 21, 2019

(65) Prior Publication Data
US 2020/0219328 A1    Jul. 9, 2020

Related U.S. Application Data

(60) Provisional application No. 62/545,780, filed on Aug. 15, 2017.

(51) Int. Cl.
*G06T 19/20* (2011.01)
*G06T 7/90* (2017.01)
*G06T 3/00* (2006.01)

(52) U.S. Cl.
CPC .......... *G06T 19/20* (2013.01); *G06T 3/0031* (2013.01); *G06T 7/90* (2017.01)

(58) Field of Classification Search
CPC ......... G06T 19/20; G06T 7/90; G06T 3/0031; G06T 2219/2004
See application file for complete search history.

(56) References Cited

U.S. PATENT DOCUMENTS

| 2009/0231336 A1 | 9/2009 | Dilbeck et al. |
| 2012/0120074 A1 | 5/2012 | Huysmans et al. |

(Continued)

OTHER PUBLICATIONS

International Search Report and Written Opinion issued in corresponding International Application No. PCT/US2018/046439, dated Oct. 25, 2018, U.S. Patent and Trademark Office, Alexandria, VA.

*Primary Examiner* — Grace Q Li
(74) *Attorney, Agent, or Firm* — Hauptman Ham, LLP

(57) ABSTRACT

A method for generating a 3D digital model used for creating a hairpiece are disclosed. The method comprises: obtaining a 3D model of a head, the 3D model containing a 3D surface mesh having one single boundary and color information associated with the 3D mesh; mapping the 3D model into a 2D image in such a manner that any continuously connected line on the 3D model is mapped into a continuously connected line in the 2D image, the 2D image containing a 2D mesh with color information applied thereto; displaying the 2D image; identifying a feature in the 2D image based on the color information; and mapping the identified feature back onto the 3D model. A system for generating a 3D digital model used for creating a hairpiece is also provided in another aspect of the present disclosure.

19 Claims, 6 Drawing Sheets

(56) References Cited

U.S. PATENT DOCUMENTS

| | | | |
|---|---|---|---|
| 2013/0124160 A1* | 5/2013 | Joshi | G06F 17/11 |
| | | | 703/2 |
| 2014/0241570 A1 | 8/2014 | Onen et al. | |
| 2016/0148435 A1 | 5/2016 | Li et al. | |
| 2017/0065061 A1 | 3/2017 | McArthur et al. | |

* cited by examiner

METHOD AND SYSTEM FOR GENERATING A 3D DIGITAL MODEL USED FOR CREATING A HAIRPIECE

This disclosure relates to custom manufacturing of hairpieces. More specifically, this disclosure relates to a method and a system for generating a 3D digital model used for creating a hairpiece.

BACKGROUND

Many individuals lose naturally growing hair due to, for example, diseases or aging, or just by heredity. Hairpieces provide an important way for improving/changing one's appearance. Previously, an area on one's head, large or small, in which hair was lost, is first outlined and measured, and a hairpiece formed on a flat base material was tailored to the size of this area and then attached to the head to cover the area, by means of, for example, gluing or braiding. One problem with this approach is that, the base material of the hairpiece is flat in shape and when it is attached to the head, creases occur and cause the hairpiece not to fit the curved shape of a head shell very well. It may look bad or cause a loose/unstable attachment of the hairpiece to a head.

In consideration of the above, custom made hairpieces have been proposed. For manufacturing a custom made hairpiece, a 3D head model is scanned on the spot and sent to a mold factory, and a physical mold of a head shell is usually produced in accordance to 3D head model of the customer's head at a mold factory, and then shipped to a hairpiece factory, where a hairpiece is custom made by using the physical mold and can be made to fit the mold and thus fit the customer's head very well.

Besides head profile presented by the physical mold, for creating a hairpiece accurately and efficiently, it is also required to provide other information, such as information about a target area, which is to be covered by a hairpiece.

SUMMARY

A need exists for a more convenient and accurate way for collecting information based on a 3D model of head.

In an aspect of the present disclosure, a method for generating a 3D digital model used for creating a hairpiece is provided, which comprises: obtaining a 3D model of a head, the 3D model containing a 3D surface mesh having one single boundary and color information associated with the 3D mesh; mapping the 3D model into a 2D image in such a manner that any continuously connected line on the 3D model is mapped into a continuously connected line in the 2D image, the 2D image containing a 2D mesh with color information applied thereto; displaying the 2D image; identifying a feature in the 2D image based on the color information; and mapping the identified feature back onto the 3D model.

In another aspect of the present disclosure, one or more processor readable storage devices is provided, which have encoded thereon instructions for causing one or more processors to perform the method for generating a 3D digital model used for creating a hairpiece as described above.

In yet another aspect of the present disclosure, a system for generating a 3D digital model used for creating a hairpiece is provided, which comprises: one or more processors and one or more processor readable storage devices, wherein the one or more processor readable storage devices have encoded thereon instructions for causing the one or more processors to perform the method for generating a 3D digital model used for creating a hairpiece as described above.

BRIEF DESCRIPTION OF THE DRAWINGS

Other features, objects, and advantages of the present disclosure will become more apparent from the following detailed description of the present disclosure when taken in conjunction with the accompanying drawings, in which.

DETAILED DESCRIPTION

The present application will now be described in further detail with reference to the accompanying drawings and examples. It is to be understood that the specific embodiments described herein are for the purpose of explaining the related invention and are not intended to limit the invention. It should also be noted that, for the sake of convenience of description, only parts related to the invention are shown in the accompanying drawings. To be specified, the embodiments in the present application and the features in the embodiments can be combined with each other without conflict.

The expression "exemplary", "example" or various forms thereof are used herein to mean serving as an example, instance or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of a varying scope could have been presented, but have been omitted for purposes of brevity.

Figure 1:
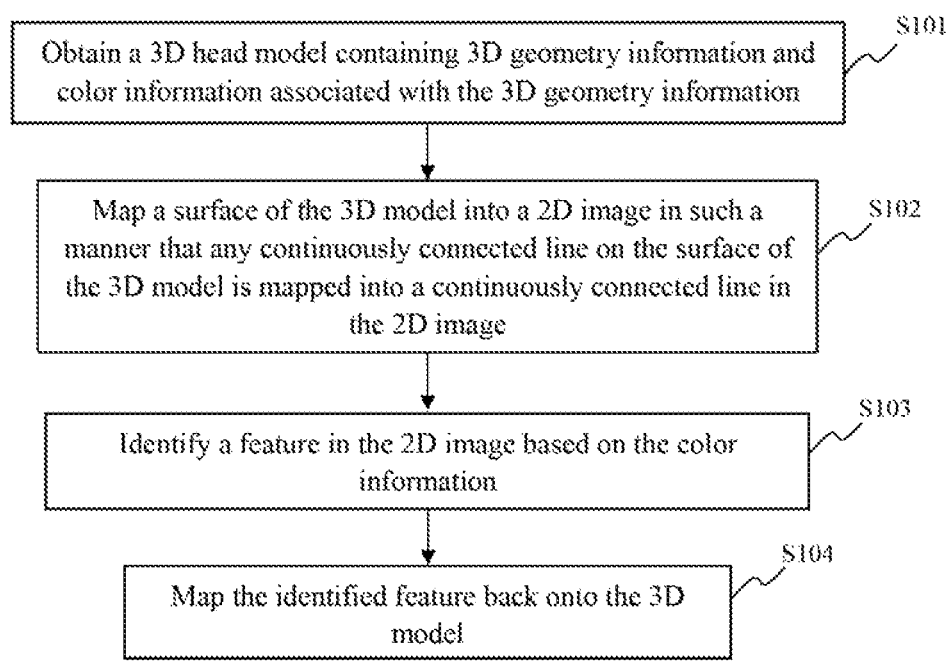
FIG. 1 is a flow chart illustrating an example of a general method for generating a 3D digital model used for creating a hairpiece of the present disclosure.

The present disclosure provides a method for generating a 3D digital model, based on which model, a physical mold can be generated. A custom made hairpiece can be created by using such a physical mold. FIG. 1 illustrates a general method for generating a 3D digital model used for creating a hairpiece of the present disclosure.

As shown in FIG. 1, in step S101, a 3D model of a head is obtained, which contains 3D geometry information and color information associated to the former. Here, as those skilled in the art will understand, 3D geometry information can be in the form of, for example, a 3D surface mesh, or be in other forms. The methods of the present disclosure are not limited in this respect.

For example, an initial 3D head model containing 3D geometry information and associated color information can be built up based on data obtained through scanning a head three-dimensionally by optical means, or based on data that already exists and can be transformed into such a 3D model. Alternatively, an existing 3D digital model can be used, instead of generating a new one.

In step S102, the 3D model is mapped into a 2D image in such a manner that any continuously connected line on the 3D model is mapped into a continuously connected line in the 2D image.

A 3D geometry can be represented as a surface mesh (a polygon mesh composed of vertices and edges/lines). The color information on a surface of a 3D geometry is usually represented as a 2D digital image which can be mapped to the 3D surface using UV coordinates associated with the 3D vertices as attributes. Usually, the UV coordinate information associated with the 3D surface in general does not have any specific requirements and the polygon connection in UV space do not need to be connected as in the 3D surface. For example, the 3D surface may have a single boundary, but in UV space the polygons may be arbitrarily split so as to accommodate the underlying 2D digital image representation. This often means that the UV polygons create many pieces (or islands) in the UV space. The result is that the 2D image is broken into pieces and does not form a continuously connected equivalent view of the 3D surface in the 2D image. This brings about the problem that, a continuously connected line on the 3D surface may be broken up between islands in the UV space, and the coordinates of points on a 3D line may jump between islands (different pieces of the 2D image), making it difficult to identify and trace the entire line.

To enable and facilitate identifying and tracing in a 2D image a feature on a surface of a 3D model, it is proposed according to some embodiments that the mapping from a 3D geometry/mesh into a 2D mesh preserves the continuity of connection between vetices/points of the meshes. That is, in step S102, the mapping is implemented in such a manner that any continuously connected line on a surface of the 3D model is mapped into a continuously connected line in the 2D image.

A 3D surface with a single boundary can be mapped to a single boundary shape (2D shape) on a plane. This 2D shape can have a single boundary of a circle, rectangle or any other suitable shape.

According to some embodiments, starting with a 3D surface mesh (polygonal mesh) with a single boundary and associated color information with an arbitrary color mapping of the 3D model obtained in step S101, step S102 in the method of the present disclosure shown in FIG. 1 can be implemented as follows:

1. mapping the 3D mesh into a 2D mesh by:
   a) giving each of the vertices on the single boundary of the 3D mesh a 2D coordinate mapping along a 2D boundary shape (for example, a circle or rectangle);
   b) assigning the remaining interior vertices of the 3D mesh an initial 2D coordinate mapping at the center of the 2D shape or at an approximate final position that is not necessarily the center of the 2D shape;
   c) by using an energy minimization technique (for example, angle preserving or area preserving technique), solving for the final position of the 2D vertices that are mapped from the interior vertices of the 3D mesh with a given metric, resulting in a 2D mesh;
2. creating a color image for the 2D mesh by:
   a) creating a transform that converts the 2D mesh from step 1(c) to image coordinates of a target 2D image with desired dimensions;
   b) for each pixel in the target 2D image created in step 2(a):
      i) calculating a relative location within the polygon of the 2D mesh;
      ii) mapping the location from step 2(b)(i) into 3D location in the 3D mesh using the mapping from step 1(c) and step 2(b)(i);
      iii) mapping the 3D location from step 2(b)(ii) back to the original color space using the color information associated with the 3D mesh.

Nevertheless, the above is given as only an exemplary illustration of how the mapping in step S102 can be implemented, and the present disclosure is not intended to be limited in this respect.

Then, in step S103, a feature of the 3D model can be identified in the 2D image based on the color information.

In some embodiments, the identification in step S103 can be done with an algorithm automatically. As there exists algorithms for identification in a 2D image based on color information which are quite efficient and robust, while identification in a 3D model according to geometric continuity of colored features is now relatively complicated and not so robust, it is very promising to improve efficiency and/or reliability of a method or algorithm for identifying a feature of 3D model with methods provided in the present disclosure.

In some other embodiments, the identification in step S103 comprises: displaying the 2D image; and detecting a tracing action of a user that traces the feature in the 2D image and recording a trajectory of the tracing action as the identified feature in the 2D image.

In step S104, the identified feature is mapped back onto the 3D model. The result is a 3D feature on the surface of the 3D model.

For example, the identified feature can be mapped back by using the mapping from step 1(c) and step 2(b)(i) in the example given and discussed in regard to step S102.

Hereinafter, detailed description of examples of the method for generating a 3D digital model used for creating a hairpiece will be given with reference to FIG. 2 as well as FIG. 3 to FIG. 12.

Figure 2:
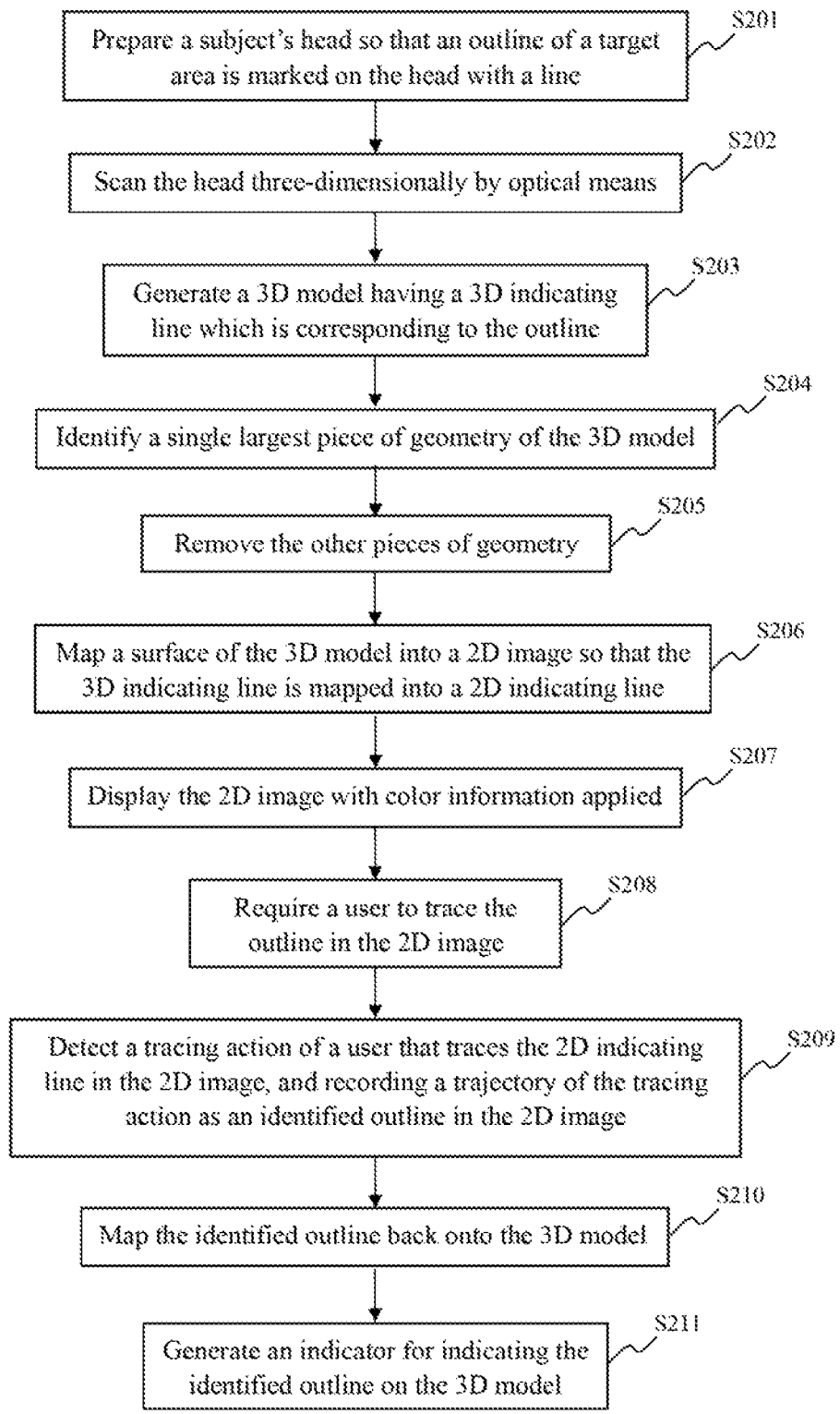
FIG. 2 is a flow chart illustrating an example of a method for generating a 3D digital model used for creating a hairpiece according to some embodiments, in which an outline of a target area on a head is identified.

FIG. 2 is a flow chart of an example of a method for generating a 3D digital model according to some embodiments. This example is described here for better understanding of the present disclosure, but not for limiting the present disclosure in any respect.

Figure 3:
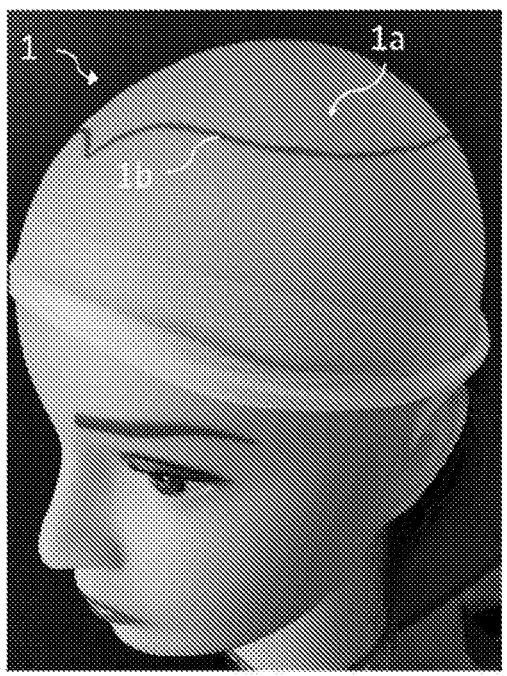
FIG. 3 shows an example of a prepared head with an outline of target area marked.
Figure 4:
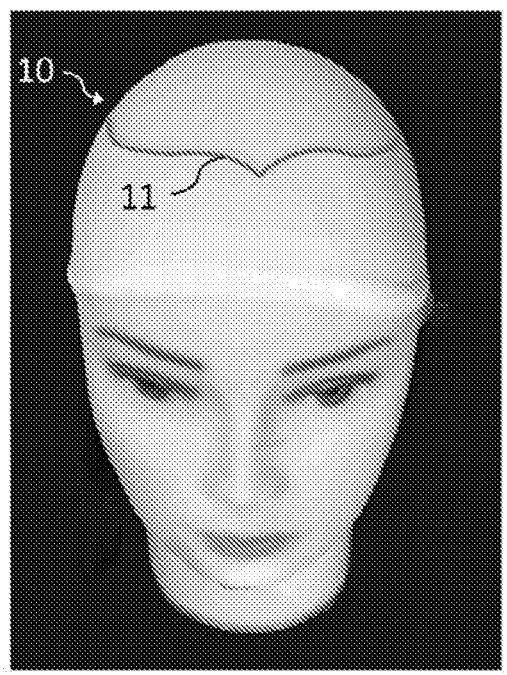
FIG. 4 shows a 3D digital model of the head in FIG. 3.

This example starts with preparing a subject's head 1 in step S201. As shown in FIG. 3, an outline 1b of a target area 1a to be covered by a hairpiece, is marked on the head, for example marked on a white cap wrapping on the head, with a line.

Then, in step S202, the head is scanned three-dimensionally by optical means such that geometric information and color information of a surface of the head can be obtained and be used to generate a 3D model (shown in FIG. 4) in step S203. The resulting 3D model 10 has a 3D indicating line 11 which is corresponding to the outline of the target area.

Figure 5:
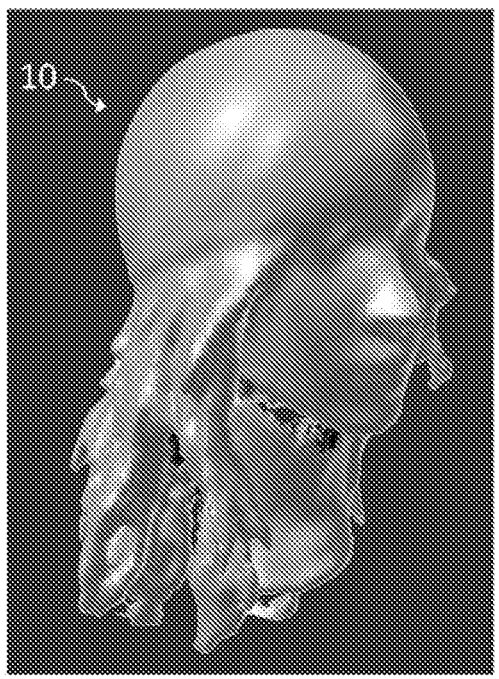
FIG. 5 shows an example of a raw 3D model of a head.
Figure 6:
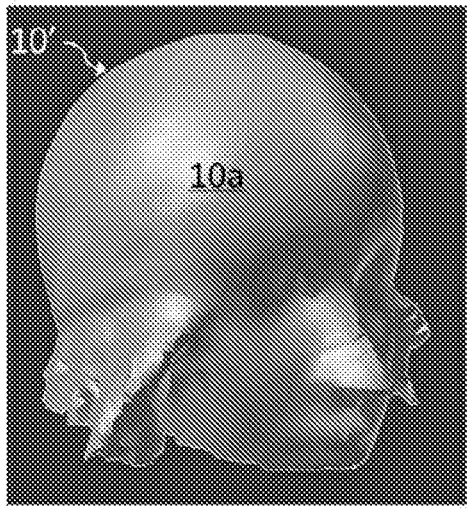
FIG. 6 shows the 3D model of FIG. 5 after removing pieces of geometry other than the largest one.

The 3D model 10 obtained in step S203 may have more than one pieces of geometries. FIG. 5 shows an example of such a 3D model (only geometry shown in FIG. 5). In consideration of efficiency and accuracy of mapping from 3D to 2D, the method in the example of FIG. 2 comprises step S204 and step S205, in which a single largest piece of geometry 10a of the 3D model 10 is identified, and the other pieces of geometry are removed. FIG. 6 shows an example of the 3D model 10' after the processing of step S204 and step S205.

In some other embodiments, as an alternative of step S204 and step S205, the method for generating a 3D model may comprise the following processing: cutting the 3D model with a cutting plane, which is positioned so that a concerned portion of the 3D model is entirely on one side of the cutting plane, and discarding the other portion of the 3D model that is on the other side of the cutting plane.

Figure 7:
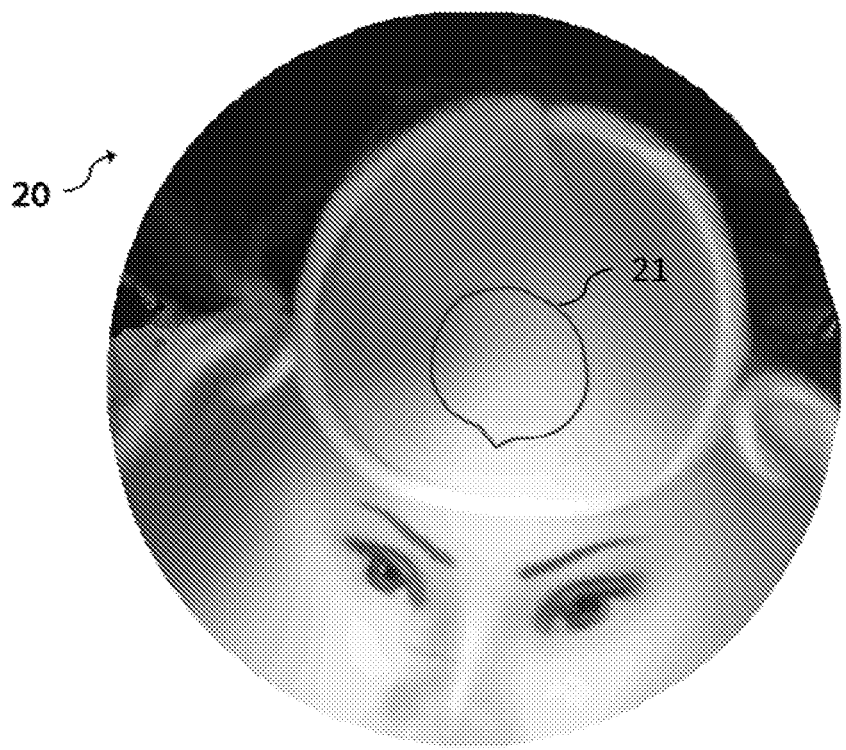
FIG. 7 shows a 2D disc obtained by mapping the 3D model of FIG. 4 into 2D image.

The resulting 3D model 10' is then mapped into a 2D image 20 in step S206 in such a manner that the 3D indicating line 11 corresponding to the outline 1b of the target area 1a is mapped into continuously connected 2D indicating line 21, as shown in FIG. 7. In the example shown in FIG. 7, the 3D model 10' is mapped into a 2D image 20 having a circular boundary shape, which may also be referred to as "2D disc".

Then in step S207, the 2D image 20 is then presented/displayed to a user with color information applied, so that the user can identify visible feature/line and manually trace the feature/line in the 2D image 20. The 2D image 20 is for example displayed on a touch screen of a tablet.

The example of FIG. 2 may optionally comprise step S208, in which a requirement is presented to the user, asking the user to trace the outline of the target area. In some embodiments, without this step, the user can initiate the identification as well.

In the example of FIG. 2, the identification is carried out manually by the user. More specifically, in step S209, a tracing action of the user that traces the 2D indicating line 21 in the 2D image 20 is detected, and upon detection, a trajectory of the tracing action can be recorded as an identified outline 21' in the 2D image 20.

Figure 8:
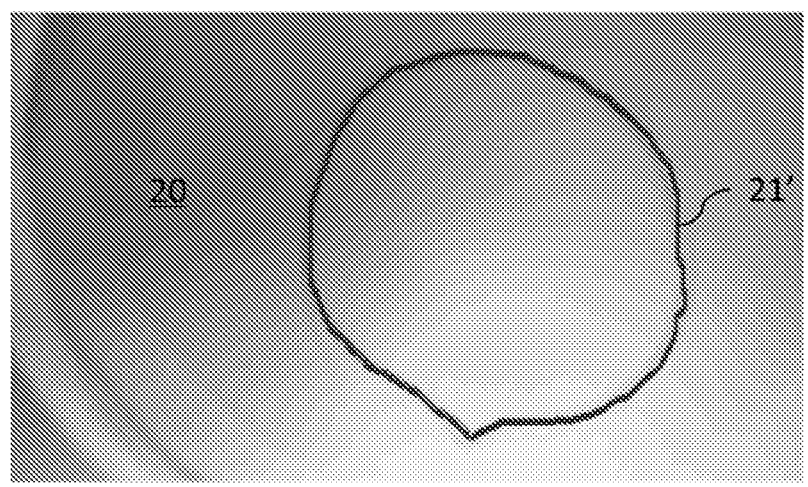
FIG. 8 is a partial enlarged view of the 2D disc shown in FIG. 7, in which a trajectory of a tracing action along a 2D indicating line is recorded as a line overlaying on the 2D disc.

As shown in FIG. 8, as the tracing action is detected, the trajectory of the tracing action can be presented as an overlay (a line in FIG. 8) on the 2D image 20. In some examples, the tracing action may be ignored according to an instruction from the user. The user may find that the tracing is not correct and stop tracing and instruct to ignore the tracing action. In some other examples, when a tracing action traces a feature indicating an outline of a target area and a trajectory of the tracing action does not form a closed loop, the tracing action can be ignored automatically.

Figure 9:
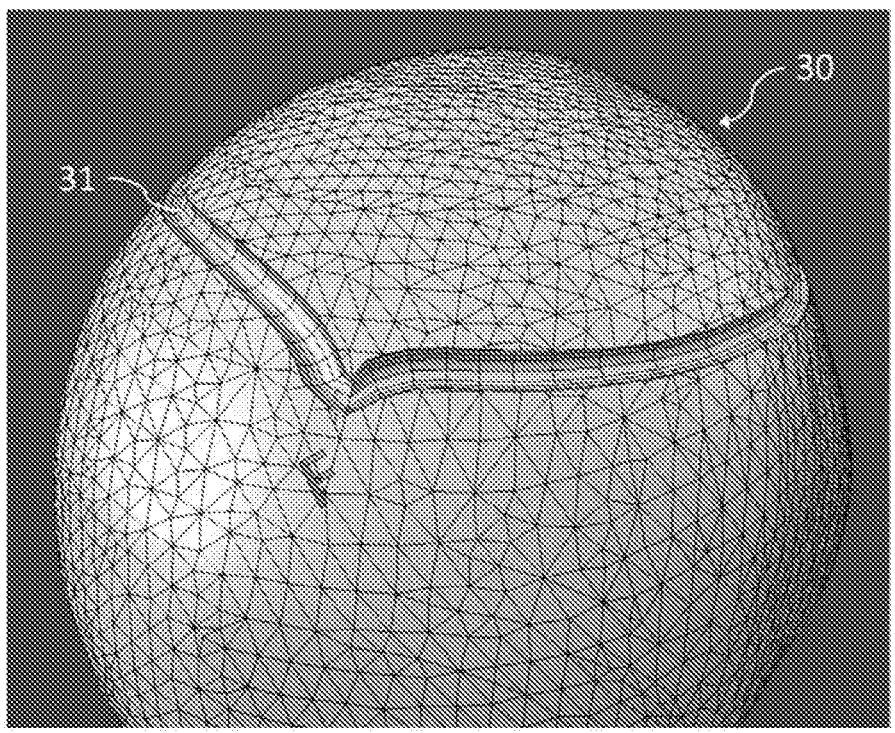
FIG. 9 shows an example of the geometry of the 3D model in FIG. 4 with a structural indication for the line mapped from the 2D image back onto the 3D model.
Figure 10:
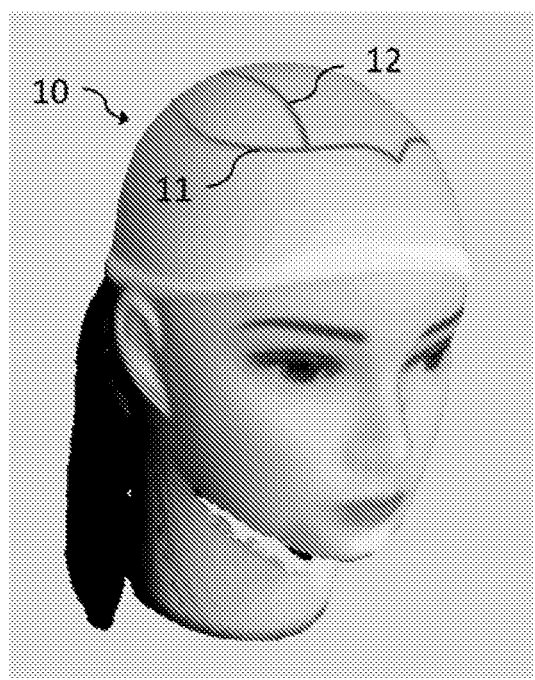
FIG. 10 shows another example of 3D model, in which a hair part line is also indicated.
Figure 11:
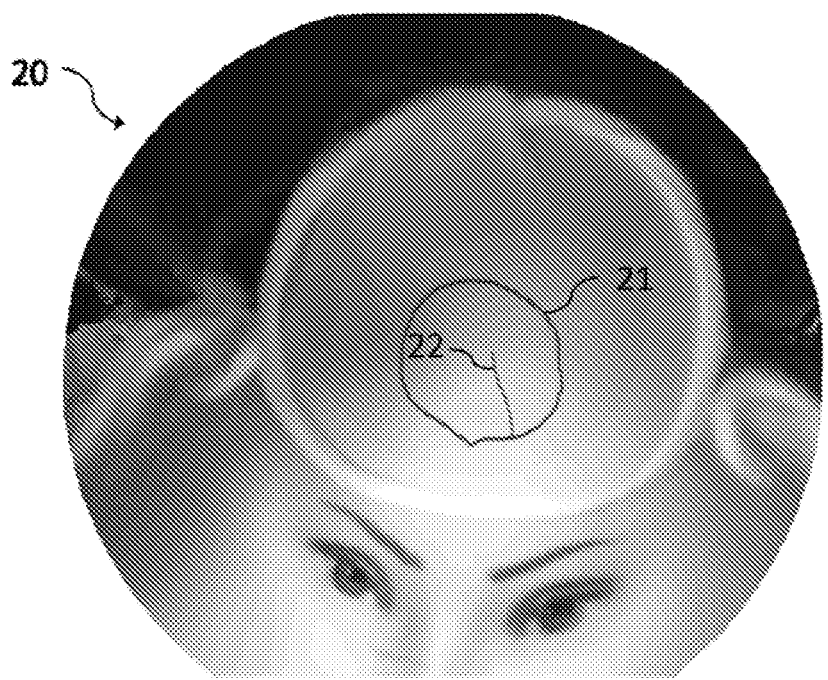
FIG. 11 shows a 2D disc obtained by mapping the 3D model of FIG. 10 into 2D image.

Then in step S210, the identified outline 21' is mapped back onto the 3D model 10'. As shown in FIG. 9, in some advantageous embodiments, an indicator (such as a groove/indentation shown in the figure) 31 can be generated on the 3D model 30 for indicating the identified outline 21', in step S211.

Figure 12:
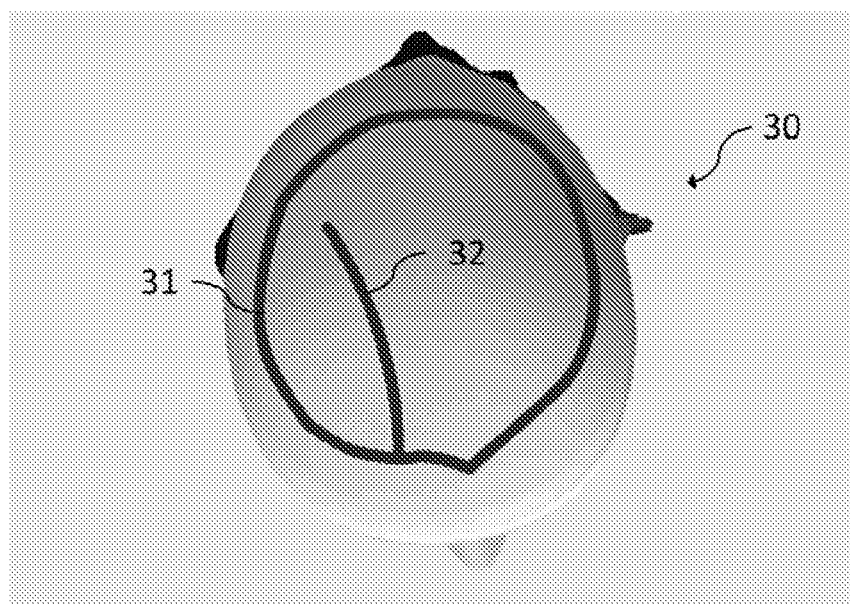
FIG. 12 shows an example of the 3D model in FIG. 10, in which both the identified outline and the part line are mapped from the 2D image back onto the 3D model and are indicated with colored indications.

Some steps of the method of FIG. 2 can be repeated to identify a further feature. In the example shown in FIG. 10 to FIG. 12, a hair part line is originally indicated on the elastic cap that is put on the head, and a second 3D indicating line 12 on the 3D model 10 is mapped into a second 2D indicating line 22 (refer to FIG. 10) in the 2D disc 20 resulted from mapping the 3D model 10' into 2D image 20 in the manner as discussed above, and then the 2D indicating line 22 (shown in FIG. 11) in the 2D disc can be traced and thus identified manually by a user. The identified part line is then mapped back onto the 3D model, and an indicator (a color feature, e.g. a red line) 32 can be generated on the 3D model 30 for indicating the identified part line, as shown in FIG. 12.

In another aspect of the present disclosure, one or more processor readable storage devices are disclosed, which has encoded thereon instructions for causing one or more processors to perform the method for generating a 3D digital model used for creating a hairpiece as described above, alone or in any combination.

In yet another aspect of the present disclosure, a system is disclosed, which comprises: one or more processors and one or more processor readable storage devices, wherein the one or more processor readable storage devices have encoded thereon instructions for causing the one or more processors to perform the method for generating a 3D digital model used for creating a hairpiece as described above, alone or in any combination.

It should be noted that although the operation of the method is described in a particular order in the drawings, this does not require or imply that the operations must be performed in that particular order, or that all of the operations shown must be performed in order to achieve the desired result. In contrast, the steps depicted in the flowchart can change their execution order. Additionally, or alternatively, certain steps can be omitted, a plurality of steps can be combined into one step, and/or a step can be decomposed into a plurality of steps.

The foregoing description is only an advantageous embodiment of the present application and a description of the technical principles of the application. It should be understood by those skilled in the art that the scope of the invention recited in this application is not limited to the technical solutions formed by the specific combination of the above-described technical features, and should also encompass other technical solutions formed by any combination of the above technical features or their equipollent features. For example, the technical solutions can be those formed through the mutual substitution between the above-mentioned features and the technical features disclosed in the present application (but not limited thereto) having similar functions.

What is claimed is:

1. A method for generating a 3D digital model used for creating a hairpiece, comprising:
    obtaining a 3D model of a head, the 3D model containing 3D geometry information and color information associated with the 3D geometry information;
    mapping a surface of the 3D model into a 2D image in such a manner that any continuously connected line on the surface of the 3D model is mapped into a continuously connected line in the 2D image;
    identifying a feature in the 2D image based on the color information; and
    mapping the identified feature in the 2D image back onto the surface of the 3D model, wherein on the 3D model rendered with the color information, an outline of a target area to be covered with a hairpiece is indicated with a first 3D indicating line; the first 3D indicating line is mapped into a first 2D indicating line in the 2D image through said mapping the 3D model into a 2D image; and said identifying a feature in the 2D image comprises: identifying the first 2D indicating line in the 2D image.

2. The method of claim 1, further comprising: processing the 3D model in such a manner that the surface of the 3D model has only one single boundary.

3. The method of claim 2, wherein said processing the 3D model comprises: identifying one single largest piece of geometry in the initial 3D model; and removing the other pieces of geometry in the raw 3D model.

4. The method of claim 2, wherein said processing the 3D model comprises: cutting the 3D model with a cutting plane, which is positioned so that a concerned portion of the 3D model is entirely on one side of the cutting plane, and discarding the other portion of the 3D model that is on the other side of the cutting plane.

5. The method of claim 2, wherein the surface of the 3D model is presented in a 3D mesh, and
said mapping the surface of the 3D model into a 2D image comprising: mapping the single boundary of the 3D mesh along a 2D boundary of a predetermined shape of the 2D image.

6. The method of claim 1, wherein the 2D image contains a 2D polygon mesh and color information applied to the 2D polygon mesh, and
said mapping the surface of the 3D model into a 2D image comprising: solving for 2D position of vertices of the 2D polygon mesh that are mapped from the interior vertices of the 3D mesh, by using an energy minimization technique.

7. The method of claim 6, wherein the energy minimization technique is an angle preserving technique or an area preserving technique.

8. The method of claim 1, wherein said identifying a feature in the 2D image is implemented with an algorithm automatically.

9. The method of claim 1, wherein said identifying a feature in the 2D image comprises:
displaying the 2D image; and
detecting a tracing action of a user that traces the feature in the 2D image and recording a trajectory of the tracing action as the identified feature in the 2D image.

10. The method of claim 9, wherein the trajectory of the tracing action is presented as an overlay on the 2D image.

11. The method of claim 9, further comprising: ignoring the tracing action according to an instruction from the user.

12. The method of claim 9, further comprising: ignoring a tracing action if the tracing action traces a feature indicating an outline of a target area and a trajectory of the tracing action does not form a closed loop.

13. The method of claim 1, wherein on the 3D model rendered with the color information, a hair part line is indicated with a second 3D indicating line;
the second 3D indicating line is mapped into a second 2D indicating line in the 2D image through said mapping the 3D model into a 2D image; and
said identifying a feature in the 2D image further comprises: identifying the second 2D indicating line in the 2D image.

14. The method of claim 1, further comprising: after mapping the identified feature back onto the 3D model, generating an indicator for indicating the identified feature on the 3D model.

15. One or more processor non-transitory readable storage devices having encoded thereon instructions for causing one or more processors to perform the method for generating a 3D digital model used for creating a hairpiece of claim 1.

16. A system for generating a 3D digital model used for creating a hairpiece, comprising: one or more processors and one or more processor readable storage devices, wherein the one or more processor readable storage devices have encoded thereon instructions for causing the one or more processors to perform the method of claim 1.

17. The system of claim 16, further comprising a display for displaying the 2D image.

18. The system of claim 17, wherein the display comprises a touch screen.

19. The system of claim 17, wherein the display, the one or more processor readable storage devices and the one or more processors are integrated in a tablet, and
the system further comprises a 3D scanner attached to the tablet for scanning a head three-dimensionally by optical means.

* * * * *